UNITED STATES PATENT OFFICE.

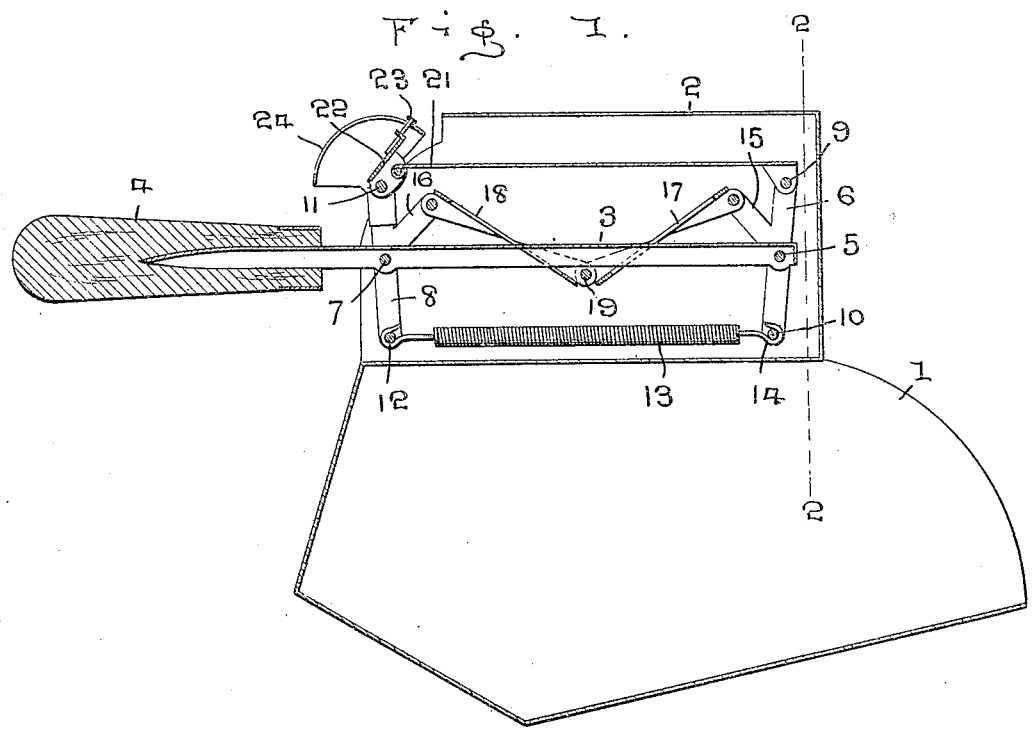
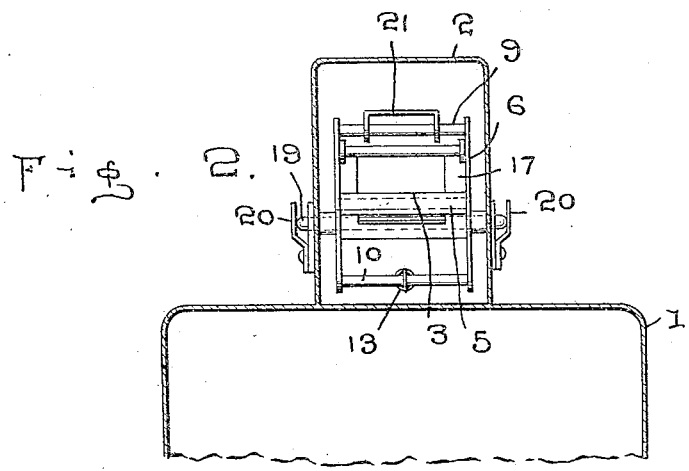

QUINTON B. WRIGHT, OF SHENANDOAH, IOWA.

WEIGHING DEVICE.

933,608.

Specification of Letters Patent. Patented Sept. 7, 1909.

Application filed May 4, 1909. Serial No. 493,833.

*To all whom it may concern:*

Be it known that I, QUINTON B. WRIGHT, a citizen of the United States, residing at Shenandoah, in the county of Page and State of Iowa, have invented certain new and useful Improvements in Weighing Devices; and I do hereby declare the following to be a full, clear, and exact description of the invention, such as will enable others skilled in the art to which it appertains to make and use the same.

My invention relates to new and useful improvements in weighing devices and more particularly to that class adapted to be used in connection with scoops and my object is to provide means for accurately weighing the contents of the scoop.

A further object is to provide means for suspending the weighing device and scoop from a suitable handle and a further object is to provide means for pivotally holding the weighing attachment in engagement with the handle.

Other objects and advantages will be hereinafter referred to and more particularly pointed out in the claims.

In the accompanying drawings forming part of this application, Figure 1 is a longitudinal sectional view through the weighing device and scoop, and, Fig. 2 is a transverse sectional view as seen on line 2—2, Fig. 1.

Referring to the drawings in which similar reference numerals designate corresponding parts throughout the several views, 1 indicates a scoop which may be constructed in the usual or any preferred manner and of that variety to be used by grocers and others for removing small quantities of flour, sugar, etc. from bins, barrels and other receptacles, one end of the scoop being open, whereby the products will readily enter the scoop and attached to the upper portion of the scoop is a housing 2, in which is located my improved weighing device.
In order to weigh the contents of the scoop without depositing the same in the usual form of scale, I provide a beam 3, one end of which projects beyond the housing and is provided with a handle 4, through the medium of which the scoop may be readily operated and transported from place to place, the inner end of the beam 3 being pivotally attached to the central bar 5 of a hanger frame 6, while that portion of the beam adjacent the end of the housing is pivotally mounted on the central bar 7 of a similar frame 8, said frames having upper and lower cross bars 9 and 10 and 11 and 12 respectively, the lower bars 10 and 12 being connected together by means of a spring 13, each end of which is provided with a hook 14, which hooks are adapted to engage the lower bars and the tension of the spring is such as to cause an inward tension on said lower bars at all times. The frames 6 and 8 are provided at a point between the upper and central bars with inwardly extending arms 15 and 16, respectively, to the upper ends of which are pivotally secured straps 17 and 18, respectively, the inner ends of said straps being pivotally mounted on a supporting shaft 19, said shaft extending laterally through the housing 2 and having bearings in the side walls thereof, the ends of said shaft protruding through the walls of the housing and against springs 20, the tension of which serve to hold the shaft 19 in proper position and against endwise movement. The shaft 19 is positioned below the beam 3, so that when the products to be weighed are placed in the scoop and the scoop raised through the medium of the handle 4, the weight of the scoop and contents thereof is directed onto the shaft 19 and will lower said shaft, this movement causing the straps 17 and 18 to move the upper ends of the frames 6 and 8 toward each other and separate the lower ends thereof, thus directing tension on the spring 13 and in order to accurately ascertain the weight of the contents of the scoop, a thrust bar 21 is pivotally secured at one end to the upper bar 9 of the frame 6, while the opposite end thereof is pivotally mounted to a finger carrying frame 22 pivotally mounted on the upper bar 11, the engagement of the thrust bar with the frame 22 being above the bar 11, so that said frame will be swung on said bar when the scoop and parts to which it is secured are lowered and by attaching a finger 23 to the frame 22 and in position to register with a scale plate 24 beyond the upper end of the frame 8, the scale (not shown) on the plate 24 being graduated to pounds and fractions thereof, the exact weight of the contents of the scoop may be readily ascertained.

In operation, the scoop is introduced into the bin or other receptacle and a quantity of the product to be weighed, entered therein, when the scoop is removed from the bin and retained in a suspended position by holding to the handle 4, when by scrutinizing the graduations upon the scale plate 24, the exact weight of the contents of the scoop will be instantly noted and if there is a greater amount of the product within the scoop than is desired, said product may be gradually removed from the end of the scoop, until the right amount remains therein, when the remainder of the product within the scoop may be entered into a bag or other suitable receptacle. In this manner, it will be readily seen that a great deal of time and labor is saved over the old manner of obtaining the scoop full of the product to be weighed and then carrying the same to a scale to be weighed, as, by employing my improved device, the weighing can be done at the bin and practically instantaneously and the contents so weighed can be immediately introduced into a bag or other suitable receptacle directly from the scoop. It will further be seen that by pivotally mounting the beam 3 and the frames 6 and 8 as shown, the weighing parts will readily adjust themselves to properly weigh the contents of the scoop regardless of whether the scoop is level or not, the spring 13 maintaining the frames in proper relationship with each other at all times.

What I claim is:

1. In a weighing device, the combination with a scoop and a housing thereon; of a beam, frames pivoted to said beam, a shaft extending through said housing, means to connect the frames with said shaft, a spring connecting the lower ends of the frames and means at the upper ends of the frames to indicate the weight of the contents of the scoop.

2. In a weighing device, the combination with a scoop and a housing therefor; of a pair of frames having cross bars at their centers and each end, a beam pivoted to the center bars, a spring connecting the lower ends of said frames, arms on said frames, a shaft extending laterally through the housing, straps connecting said arms to the shaft, a frame pivotally attached to the upper cross bar of one of said first-mentioned frames, an indicating finger carried by said last mentioned frame, a scale plate coöperating with the indicating finger and means connecting said last mentioned frame with the frame at the opposite end of the housing whereby when articles are placed in the scoop, the weight thereof will be indicated by said finger.

3. In a weighing device, the combination with a scoop having a housing therefor; of a pair of frames, a beam pivoted to the central portion of said frames, a shaft extending laterally through the housing, straps connecting said frames with the shaft, means to direct inward tension on the lower ends of said frames, a finger pivotally mounted on the upper end of one of said frames, a scale plate coöperating with said finger, a thrust bar pivoted at one end to said finger and at its opposite end to the opposite frame, whereby when the scoop and housing are lowered, by placing articles therein, the weight of the article will be indicated by said finger.

In testimony whereof I have signed my name to this specification in the presence of two subscribing witnesses.

QUINTON B. WRIGHT.

Witnesses:
F. M. HOVENDEN,
CLARENCE C. FLETCHER.